US012746687B2

(12) United States Patent
Shim et al.

(10) Patent No.: US 12,746,687 B2
(45) Date of Patent: Sep. 29, 2026

(54) SECURITY ROBOT HAVING FIRE EXTINGUISHER MOUNTED THEREON

(71) Applicant: SEOROBOTICS CO., LTD., Anyang-si (KR)

(72) Inventors: Jae Ik Shim, Seoul (KR); Sung Wook Jo, Suwon-si (KR); Young Jun Lee, Gunpo-si (KR)

(73) Assignee: SEOROBOTICS CO., LTD., Anyang-si (KR)

( * ) Notice: Subject to any disclaimer, the term of this patent is extended or adjusted under 35 U.S.C. 154(b) by 0 days.

(21) Appl. No.: 19/124,260

(22) PCT Filed: Aug. 9, 2023

(86) PCT No.: PCT/KR2023/011752

§ 371 (c)(1),
(2) Date: Apr. 24, 2025

(87) PCT Pub. No.: WO2024/090753

PCT Pub. Date: May 2, 2024

(65) Prior Publication Data

US 2026/0008185 A1 Jan. 8, 2026

(30) Foreign Application Priority Data

Oct. 25, 2022 (KR) ........................ 10-2022-0137962

(51) Int. Cl.
*B25J 11/00* (2006.01)
*A62C 27/00* (2006.01)
(Continued)

(52) U.S. Cl.
CPC ............ *B25J 11/002* (2013.01); *A62C 27/00* (2013.01); *B25J 9/102* (2013.01); *B25J 9/126* (2013.01); *B25J 13/006* (2013.01); *B25J 19/023* (2013.01)

(58) Field of Classification Search
CPC .......... B25J 11/002; B25J 9/102; B25J 9/126; B25J 13/006; B25J 19/023; A62C 27/00
(Continued)

(56) References Cited

U.S. PATENT DOCUMENTS 2,360,397 A * 10/1944 Carpenter .............. A62C 27/00 169/24
3,724,554 A * 4/1973 Rupert ................... A62C 27/00 169/24
(Continued)

FOREIGN PATENT DOCUMENTS

CN 214860768 U 11/2021
KR 10-1999-0069128 A 9/1999
(Continued)

*Primary Examiner* — Chee-Chong Lee
(74) *Attorney, Agent, or Firm* — Bridgeway IP Law Group, PLLC; Sang Ho Lee; Hyun Woo Shin

(57) ABSTRACT

A security robot having a fire extinguisher mounted thereon according to an embodiment of the present invention includes: a box unit in which a fire extinguisher is aligned and mounted; and an actuator unit placed on one side of the box unit, wherein the actuator unit includes: a motor unit installed on the first bracket and configured to output rotational power; a first gear installed on a motor shaft of the motor unit; and a second gear rotatably installed on the first bracket, wherein one side of the second gear is provided with a gear so that the gear is engaged with the first gear, and another side of the second gear is provided with a pusher face so that the pusher face presses a valve button of the fire extinguisher when the motor unit is operated.

4 Claims, 10 Drawing Sheets

(51) Int. Cl.

| | |
|---|---|
| ***B25J 9/10*** | (2006.01) |
| ***B25J 9/12*** | (2006.01) |
| ***B25J 13/00*** | (2006.01) |
| ***B25J 19/02*** | (2006.01) |

(58) Field of Classification Search
USPC ............................................................ 169/24
See application file for complete search history.

(56) References Cited

U.S. PATENT DOCUMENTS

| | | | | |
|---|---|---|---|---|
| 3,762,478 | A * | 10/1973 | Cummins .............. | A62C 27/00 169/25 |
| 4,420,047 | A * | 12/1983 | Bruensicke .............. | A62C 5/02 169/53 |
| 4,678,041 | A * | 7/1987 | Staudinger ............... | B60G 5/04 296/147 |
| 4,709,773 | A * | 12/1987 | Clement .............. | B62D 55/065 280/5.2 |
| 5,836,398 | A * | 11/1998 | White .................. | A62C 3/0278 169/62 |
| 5,860,479 | A * | 1/1999 | LaFollette .............. | A62C 27/00 169/24 |
| 5,890,544 | A | 4/1999 | Love et al. | |
| 6,263,989 | B1 * | 7/2001 | Won ..................... | B62D 55/065 180/9.32 |
| 6,289,995 | B1 * | 9/2001 | Fuller ................... | F41B 9/0031 239/722 |
| 6,604,021 | B2 * | 8/2003 | Imai ....................... | G06N 3/008 700/56 |
| 6,832,604 | B1 * | 12/2004 | Thompson .............. | F41B 11/57 124/75 |
| 7,182,144 | B2 * | 2/2007 | Baba ........................ | B25J 11/00 239/69 |
| 7,283,057 | B2 * | 10/2007 | Kim ....................... | G08B 17/10 340/629 |
| 7,332,890 | B2 * | 2/2008 | Cohen ................... | A47L 9/2873 320/109 |
| 7,478,817 | B1 * | 1/2009 | Carrier ...................... | F41H 7/02 440/12.5 |
| 7,619,534 | B2 * | 11/2009 | Barrieau ................ | G08B 17/12 340/521 |
| 7,631,700 | B1 * | 12/2009 | Gil ......................... | A62C 27/00 180/9.1 |
| 7,909,112 | B2 * | 3/2011 | Decker .................. | A62C 27/00 280/402 |
| 7,933,684 | B2 * | 4/2011 | Sugino ................. | G05D 1/0255 700/262 |
| 2001/0013828 | A1 * | 8/2001 | Geerts .................... | A01K 29/00 340/541 |
| 2004/0073337 | A1 * | 4/2004 | McKee ................ | G05D 1/0251 700/245 |
| 2007/0296570 | A1 * | 12/2007 | Barrieau ................ | G08B 17/12 340/521 |
| 2010/0038098 | A1 * | 2/2010 | Groonwald ............ | A62C 27/00 169/14 |
| 2011/0232925 | A1 * | 9/2011 | Al-Azemi .............. | A62C 27/00 169/52 |

FOREIGN PATENT DOCUMENTS

| | | | |
|---|---|---|---|
| KR | 20-0378223 | Y1 | 3/2005 |
| KR | 10-2013-0067650 | A | 6/2013 |
| KR | 10-1304529 | A | 9/2013 |
| KR | 10-1400769 | B1 | 5/2014 |
| KR | 10-1449967 | B1 | 10/2014 |
| KR | 10-1538478 | B1 | 7/2015 |
| KR | 10-2017-0059093 | A | 5/2017 |
| KR | 10-1925203 | B1 | 2/2019 |
| KR | 10-2021-0030204 | A | 3/2021 |

* cited by examiner

SECURITY ROBOT HAVING FIRE EXTINGUISHER MOUNTED THEREON

TECHNICAL FIELD

The present invention relates to a security robot having a fire extinguisher mounted thereon, the security robot being capable of patrolling in place of a person and extinguishing a fire in its early stages due to the mounted fire extinguisher.

BACKGROUND ART

Generally, important buildings are staffed with security personnel who patrol the areas to monitor for intrusions and fires.

For example, there are security facilities such as installing security facilities at entrances to control entry and exit so that only authorized persons can enter, or installing window open detectors to detect unintended opening of windows.

As another example, there is a security technology that detects a person's body temperature and detects a person's movement to determine if there is an intruder in a security area at an unauthorized time.

As still another example, there is a technology to monitor by installing CCTV in areas where intruders are expected to invade.

Additionally, it is necessary to prepare for intruders who intentionally enter through unexpected routes, for example, who break in by damaging a wall instead of a regular entrance or exit or enter through air purification facilities.

That is, security personnel are deployed to guard against unexpected and unusual intrusions, and security personnel patrol important facilities.

Meanwhile, around major facilities or facilities where fire is likely to occur, fire alarms are installed to monitor fires and automatically activate fire extinguishing devices when a fire occurs.

However, fire accidents can occur suddenly in any facility that managers do not anticipate, and it may be realistically difficult to equip all facilities with fire prevention facilities.

RELATED ART DOCUMENTS

Patent Documents (Patent Document 1) KR 10-2013-0067650 A
(Patent Document 2) KR 10-1400769 B1
(Patent Document 3) KR 10-1449967 B1
(Patent Document 4) KR 10-2017-0059093 A
(Patent Document 5) KR 10-1925203 B1

DISCLOSURE

Technical Problem

Therefore, the present invention has been made in view of the above problems, and it is one object of the present invention to provide a security robot having a fire extinguisher mounted thereon, the security robot being capable of patrolling facilities in place of security personnel and quickly extinguishing a fire in its early stages if it detects a fire outbreak during the patrol.

Technical Solution

In accordance with an aspect of the present invention, the above and other objects can be accomplished by the provision of a security robot having a fire extinguisher mounted thereon, including: a box unit 20 in which a fire extinguisher 40 is aligned and mounted; and an actuator unit 30 placed on one side of the box unit 20, wherein the actuator unit 30 includes: a motor unit 33 installed on the first bracket 31 and configured to output rotational power; a first gear 34 installed on a motor shaft of the motor unit 33; and a second gear 35 rotatably installed on the first bracket 31, wherein one side of the second gear 35 is provided with a gear so that the gear is engaged with the first gear 34, and another side of the second gear 35 is provided with a pusher face 36 so that the pusher face 36 presses a valve button 44 of the fire extinguisher 40 when the motor unit 33 is operated.

In addition, the security robot having a fire extinguisher mounted thereon according to an embodiment of the present invention may include a stopper pin 37 installed on the first bracket 31, wherein the stopper pin 37 limits reverse rotation such that the second gear 35 cannot rotate further when the second gear 35 rotates in reverse, and the reverse rotation limitation of the second gear 35 is set to a posture of the second gear 35 when the fire extinguisher 40 is not in operation.

In addition, in the security robot having a fire extinguisher mounted thereon according to an embodiment of the present invention, a radius of a pitch circle of the second gear 35 may be 1.5 to 2.5 times longer than a distance from the center of rotation of the second gear 35 to the point where the pusher face 36 touches the valve button 44, and the pitch circle of the second gear 35 may be 3 to 4 times longer than a pitch circle of the first gear 34.

In addition, in the security robot having a fire extinguisher mounted thereon according to an embodiment of the present invention, the base wall 22 may be vertically arranged inside the box unit 20, the pocket mount 24 may be concavely formed in the base wall 22, and a portion of a valve assembly 42 of the fire extinguisher 40 may be accommodated in the pocket mount 24 so that the posture of the fire extinguisher 40 is aligned and the position of the valve button 44 is set.

In addition, in the security robot having a fire extinguisher mounted thereon according to an embodiment of the present invention, a supporter 26 may be placed on the bottom of the box unit 20, wherein the supporter 26 forms a straight groove so that, when the fire extinguisher 40 enters the supporter 26, the fire extinguisher 40 enters while resting on the straight groove, which ensures a direction of entry not to be crooked but to be straight and prevents the valve button 44 from hitting the box unit 20.

In addition, in the security robot having a fire extinguisher mounted thereon according to an embodiment of the present invention may include a cap cover 50 made of an elastic material and mounted on the bottom of the fire extinguisher 40; and a mount cover 52 arranged on the outside of the cap cover 50 and fixed to the box unit 20, wherein the cap cover 50 absorbs shock that may occur when the fire extinguisher 40 moves by inertia when the security robot stops after driving, and the mount cover 52 prevents the fire extinguisher 40 from being detached.

In addition, in the security robot having a fire extinguisher mounted thereon according to an embodiment of the present invention, a mounting hole 54 may be formed on one side of the mount cover 52, wherein a nozzle 47 of the fire extinguisher 40 is aligned and placed in the mounting hole 54 so that a fire-extinguishing powder is aimed at and sprayed to a target point.

In addition, the security robot having a fire extinguisher mounted thereon according to an embodiment of the present invention may include a camera unit 11 for taking video images, the camera unit 11 being equipped with a thermal imaging camera and a video camera; a drive unit 12 configured to drive the security robot 10 to a desired location; and a communication unit 17 configured to transmit video data collected from the security robot 10 to a remote management room and receive a command from the remote management room.

Specific details of other embodiments are included in the detailed description and the accompanying drawings.

Advantageous Effects

A security robot having a fire extinguisher mounted thereon according to an embodiment of the present invention configured as described above can eliminate mistakes that may occur due to fatigue of security personnel by patrolling instead of security personnel, and can patrol close to places that are difficult for people to access, such as a place to store hazardous materials and a distribution panel where high-voltage power flows.

In addition, the security robot having a fire extinguisher mounted thereon according to an embodiment of the present invention can move to the location of a fire and operate a fire extinguisher to extinguish the fire in its early stages when a fire occurs during patrol or when there is a command from a management office that remotely manages the security robot, thereby preventing the fire from spreading further.

BEST MODE FOR CARRYING OUT THE INVENTION

Figure 1:
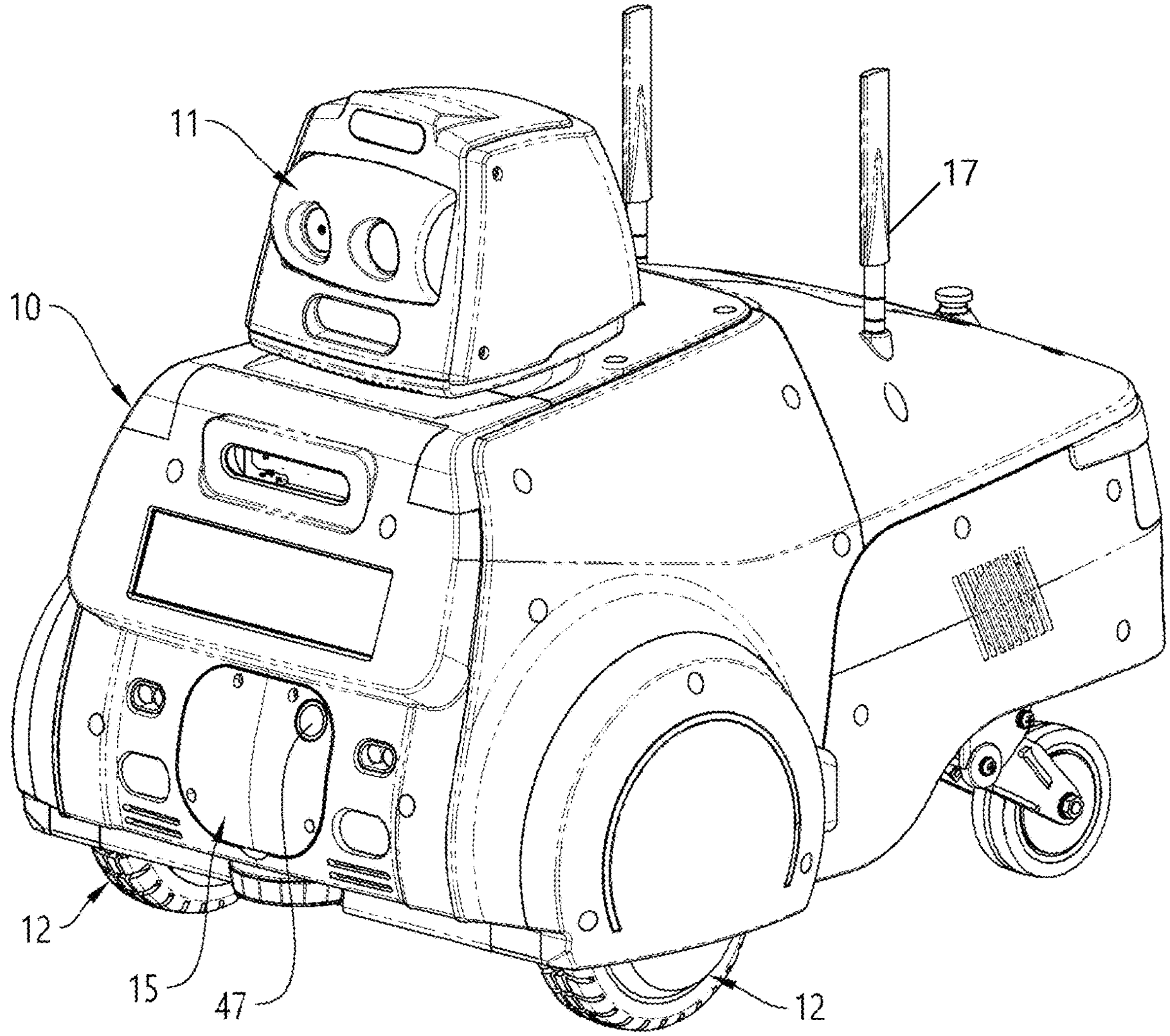
FIG. 1 illustrates a security robot having a fire extinguisher mounted thereon according to an embodiment of the present invention.

The advantages and features of the present invention and the method of achieving them will become apparent with reference to the embodiments described in detail below together with the accompanying drawings.

Hereinafter, an embodiment of the present invention will be described in detail with reference to the accompanying drawings. The embodiment described below is provided as an example to help understand the present invention, and it should be understood that the present invention can be implemented in various ways different from the embodiment described herein. However, in the following description of the present invention, a detailed description of known functions and configurations incorporated herein will be omitted when it may make the subject matter of the present invention unclear. In addition, the accompanying drawings are not drawn to their actual scales and some components may be drawn with exaggerated sizes to help understand the invention.

Meanwhile, terms such as first, second, etc. may be used to describe various components, but the components should not be limited by the terms. The terms are used solely for the purpose of distinguishing one component from another. For example, without going beyond the scope of the present invention, the first component may be named the second component, and similarly, the second component may also be named the first component.

On the other hand, the terms described below are terms established in consideration of their functions in the present invention and thus may vary depending on the intention of a producer or custom. Accordingly, the definitions of the terms should be understood on the basis of the entire description of the present specification.

Throughout the specification, like reference numerals denote like elements.

[Description of Symbols]

| | |
|---|---|
| 10: security robot | 11: sensor unit |
| 12: drive unit | 13: base frame |
| 14: case pocket | 15: outer cover |
| 16: nozzle hole | |
| 20: box unit | 22: base wall |
| 24: pocket mount | 26: supporter |
| 28: cover box | |
| 30: actuator unit | 31, 32: first and second brackets |
| 33: motor unit | 34, 35: first and second gears |
| 36: pusher face | 37: stopper pin |
| 38, 39: first and second bearings | |
| 40: fire extinguisher | |
| 41: barrel | 42: valve assembly |
| 43: valve head | 44: valve button |
| 45: pressure gauge | 46: hose |
| 47: nozzle | 48: nut |
| 50: cap cover | |
| 52: mount cover | 54: mounting hole |

BEST MODE FOR CARRYING OUT THE INVENTION

Hereinafter, a security robot having a fire extinguisher mounted thereon according to an embodiment of the present invention is described in detail with reference to FIGS. 1 to 8.

Figure 2A:
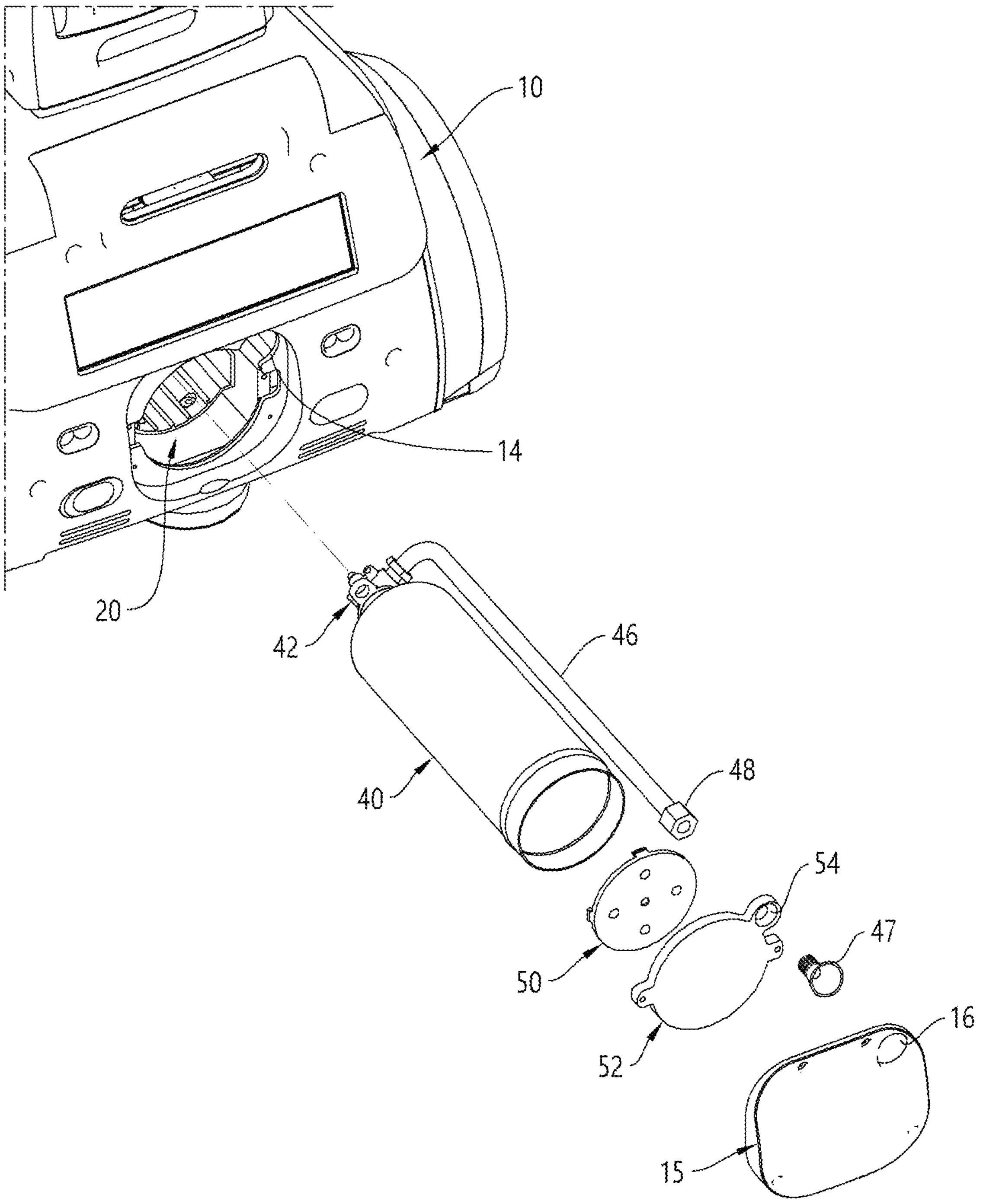
FIGS. 2A and 2B are drawings for explaining an example of removing or mounting a fire extinguisher from the security robot having the fire extinguisher mounted thereon according to an embodiment of the present invention.
Figure 2B:
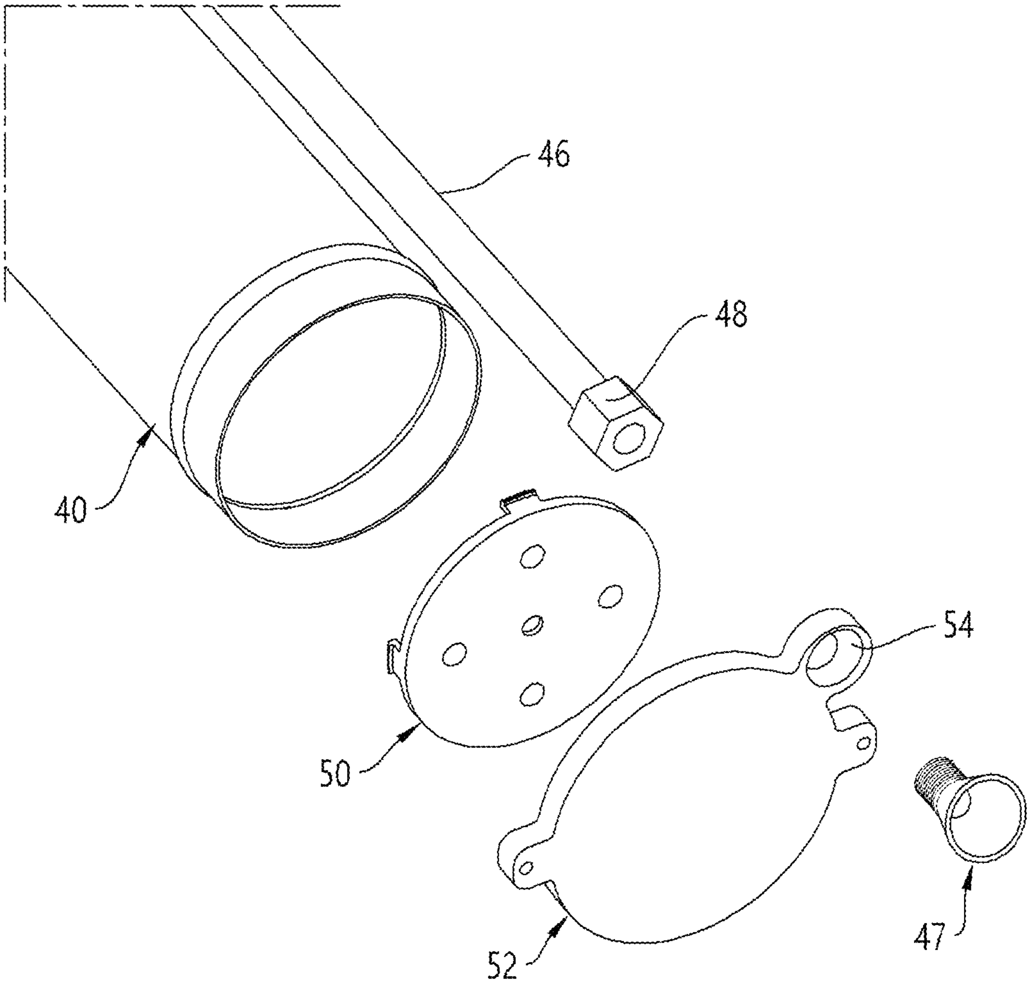
Figure 3:
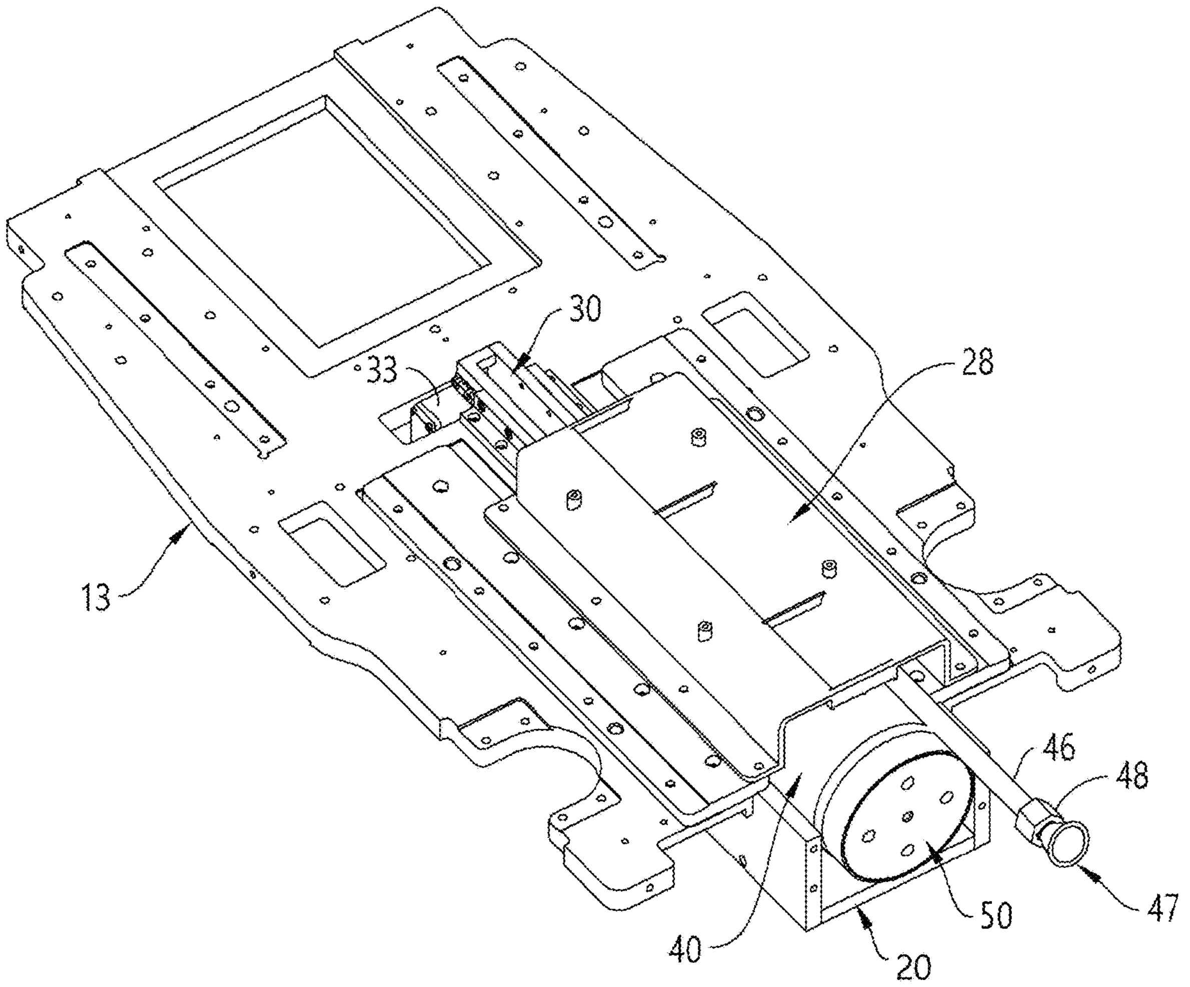
FIG. 3 illustrates main components for mounting a fire extinguisher in the security robot having a fire extinguisher mounted thereon according to an embodiment of the present invention.
Figure 4:
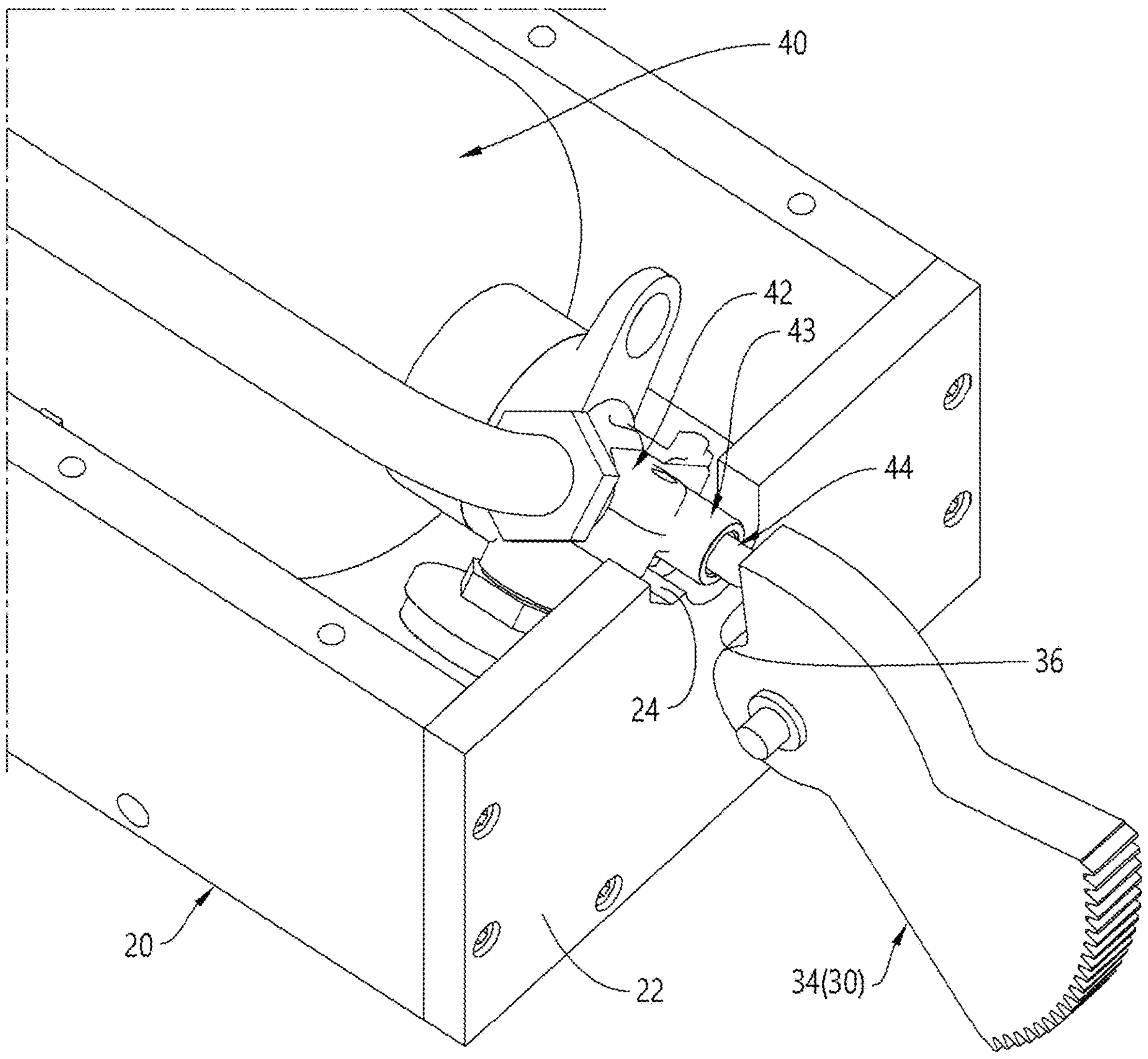
FIG. 4 illustrates a head part of a fire extinguisher mounted in the security robot having the fire extinguisher mounted thereon according to an embodiment of the present invention.
Figure 5A:
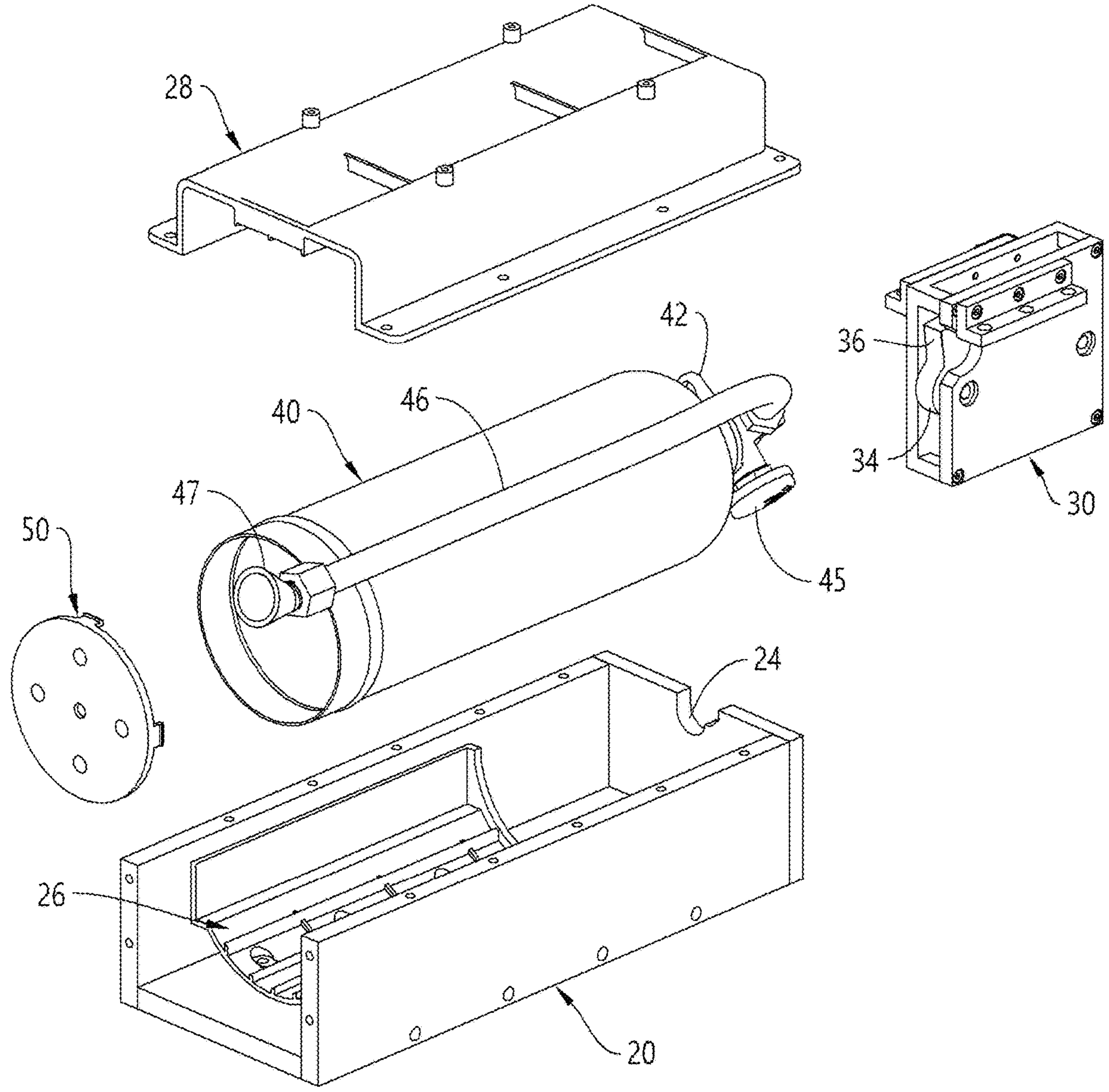
FIGS. 5A and 5B are drawings for explaining a box unit on which a fire extinguisher is mounted and an actuator unit that operates a fire extinguisher in the security robot having a fire extinguisher mounted thereon according to an embodiment of the present invention.
Figure 5B:
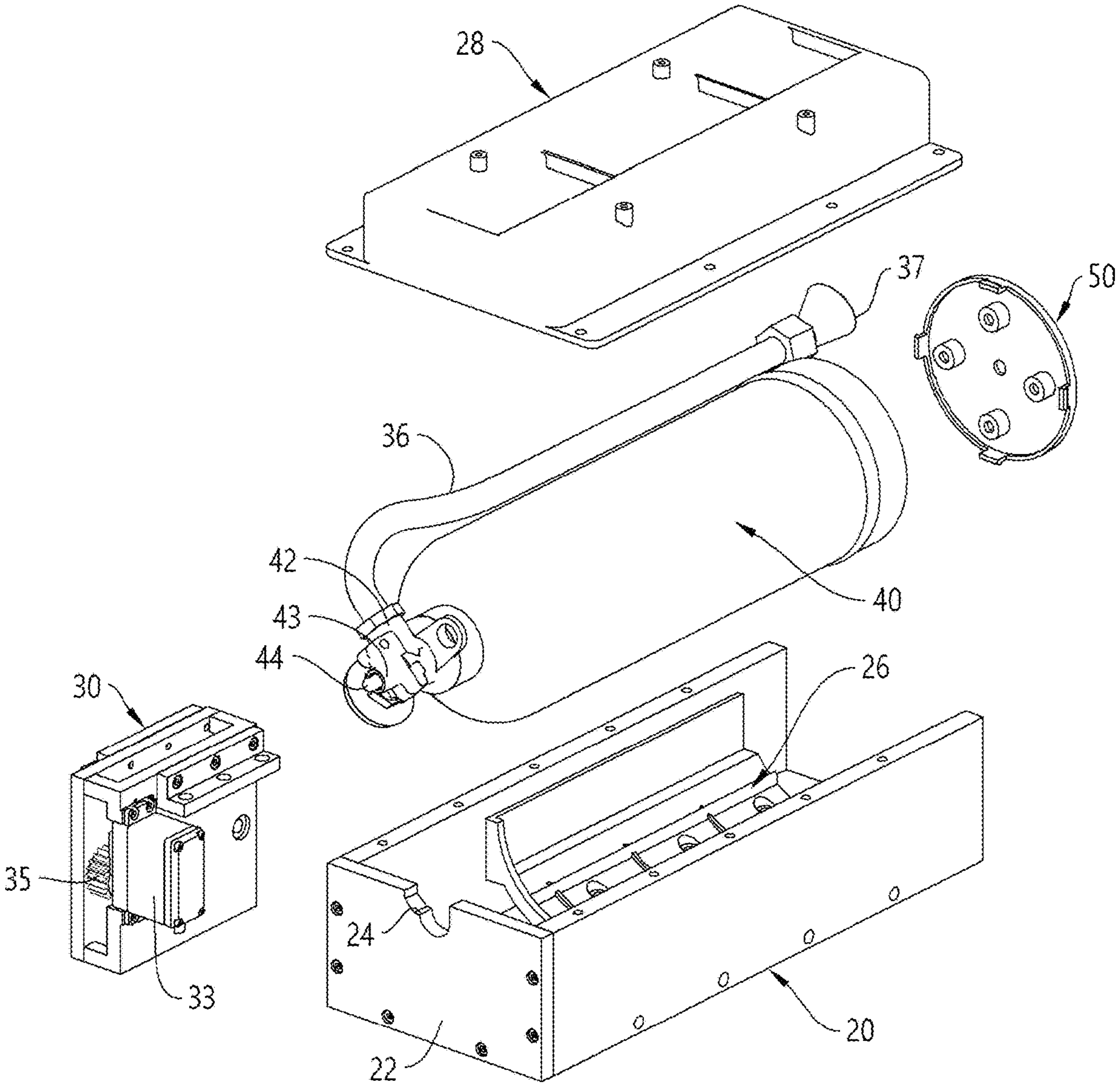
Figure 6:
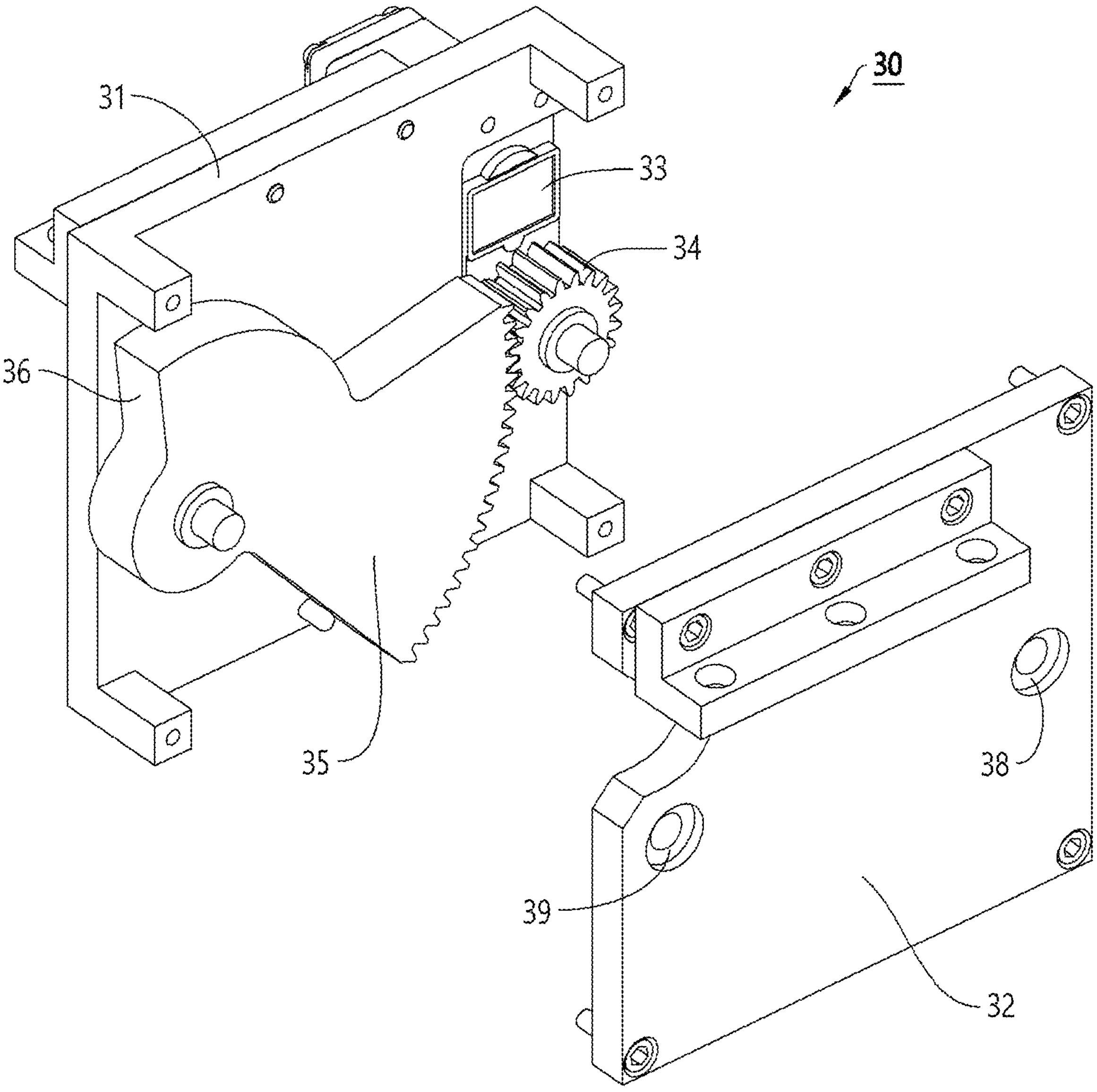
FIG. 6 is a drawing for explaining the configuration of the actuator unit provided in the security robot having a fire extinguisher mounted thereon according to an embodiment of the present invention.
Figure 7:
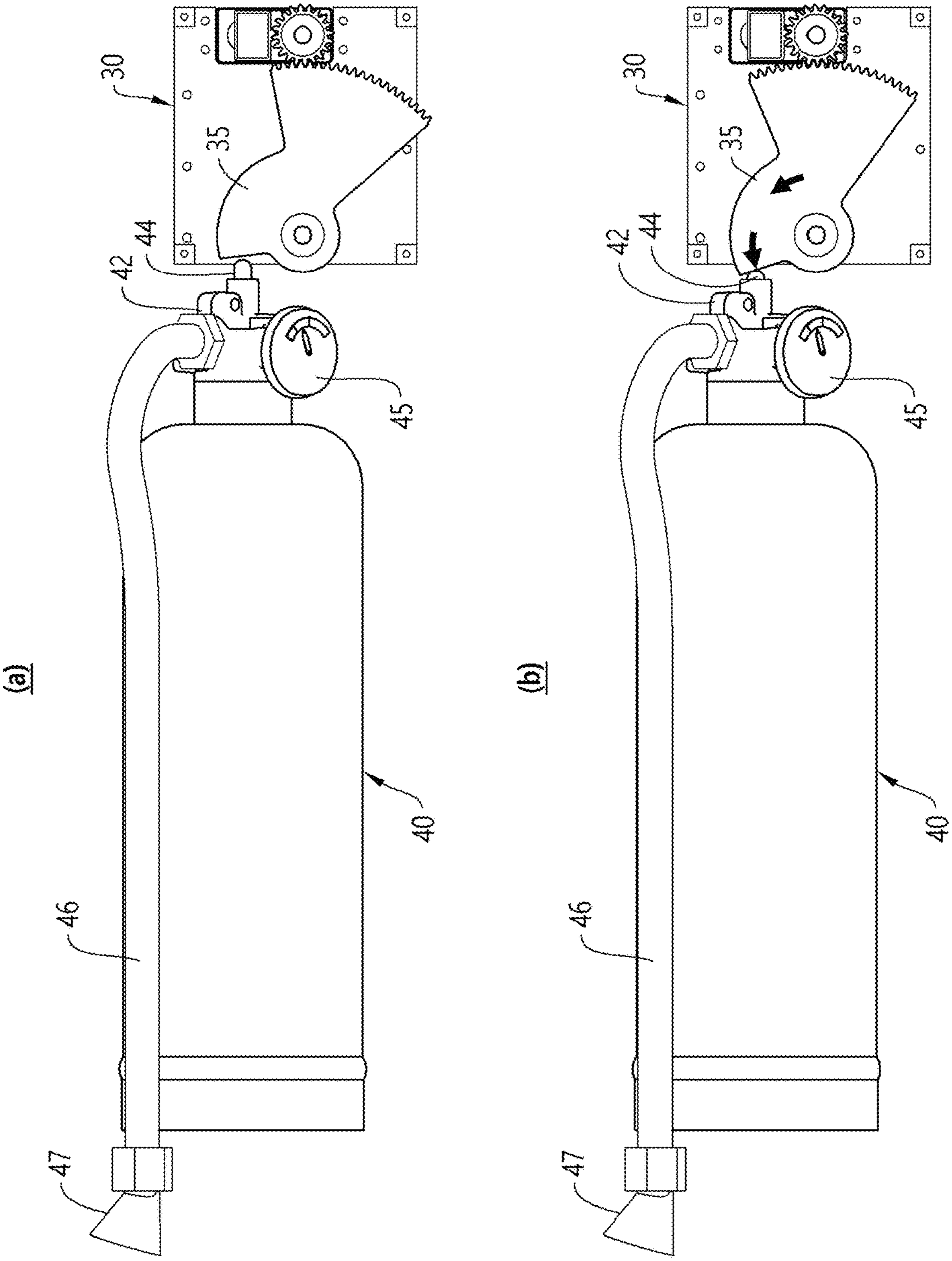
FIGS. 7 and 8 are drawings for explaining the operation of the actuator unit provided in the security robot having a fire extinguisher mounted thereon according to an embodiment of the present invention.
Figure 8:
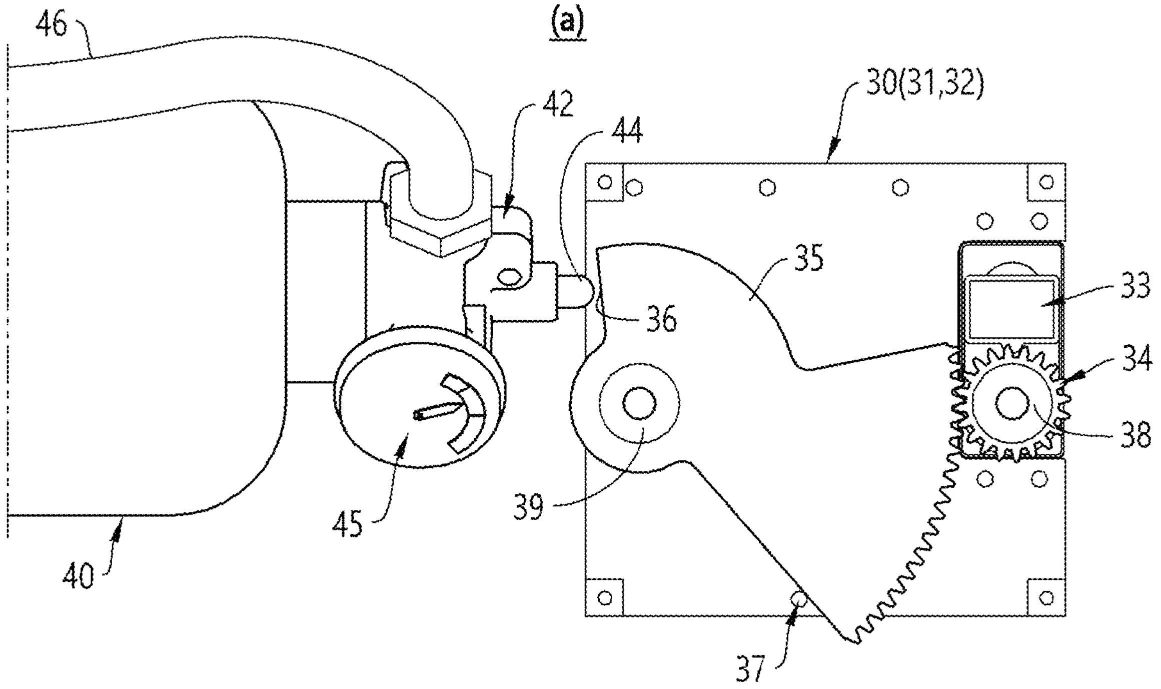
Figure 8:
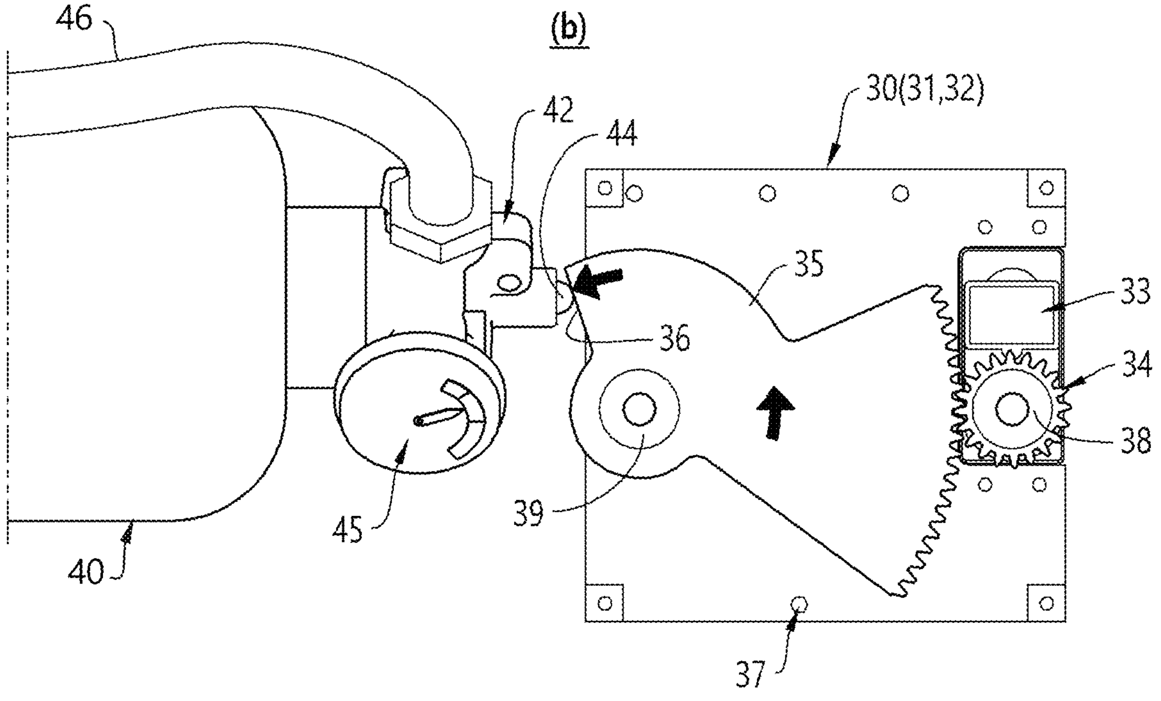

FIG. 1 illustrates a security robot having a fire extinguisher mounted thereon according to an embodiment of the present invention. FIGS. 2A and 2B are drawings for explaining an example of removing or mounting a fire extinguisher from the security robot having the fire extinguisher mounted thereon according to an embodiment of the present invention. FIG. 3 illustrates main components for mounting a fire extinguisher in the security robot having a fire extinguisher mounted thereon according to an embodiment of the present invention. FIG. 4 illustrates a head part of a fire extinguisher mounted in the security robot having the fire extinguisher mounted thereon according to an embodiment of the present invention. FIGS. 5A and 5B are drawings for explaining a box unit on which a fire extinguisher is mounted and an actuator unit that operates a fire extinguisher in the security robot having a fire extinguisher mounted thereon according to an embodiment of the present invention. FIG. 6 is a drawing for explaining the configuration of the actuator unit provided in the security robot having a fire extinguisher mounted thereon according to an embodiment of the present invention. FIGS. 7 and 8 are drawings for explaining the operation of the actuator unit provided in the security robot having a fire extinguisher mounted thereon according to an embodiment of the present invention.

A security robot 10 having a fire extinguisher mounted thereon according to an embodiment of the present invention may include a camera unit 11, a drive unit 12 and a communication unit 17.

The camera unit 11 may be equipped with a thermal imaging camera and a video camera. The thermal imaging camera may capture thermal images to determine temperature distribution, and may detect fire when it occurs in a facility.

The video camera captures the front of the security robot 10.

The camera unit 11 may include a controller, and synthesize a first image, captured by the thermal imaging camera, and a second image, captured by the video camera, to distinguish whether the detection of high temperatures in areas, where high temperatures are detected, is due to fire or normal temperatures occurring in a facility.

That is, the camera unit 11 may more accurately determine whether a fire has occurred because it includes the thermal imaging camera and the video camera.

The drive unit 12 drives the security robot 10 to a desired location. The security robot 10 may drive autonomously, may drive along a designated path, or may drive as controlled by a remote control room.

The communication unit 17 may transmit video data collected from the security robot 10 to a remote management room and receive a command from the remote management room.

An administrator of the remote management room may remotely control the security robot 10.

Meanwhile, the security robot having a fire extinguisher mounted thereon according to an embodiment of the present invention may include a base frame 13, and a box unit 20 and actuator unit 30 installed on the base frame 13, as shown in FIG. 3.

The fire extinguisher 40 may be arranged and mounted in the box unit 20.

The actuator unit 30 may be placed on one side of the box unit 20.

The actuator unit 30 may include a motor unit 33, a first gear 34 and a second gear 35, as shown in FIG. 6.

The motor unit 33 may be installed on a first bracket 31, and outputs rotational power through a motor shaft.

The first gear 34 is installed on the motor shaft of the motor unit 33.

The second gear 35 is installed to be rotatable with the first bracket 31, a gear is formed on one side so that the gear is engaged with the first gear 34, and a pusher face 36 is formed on the other side.

When the motor unit 33 operates, the first gear 34 rotates the second gear 35, and then the pusher face 36 presses a valve button 44 of the fire extinguisher 40.

Meanwhile, a second bracket 32 may be placed on the opposite side of the first bracket 31, and the second bracket 32 may support the first gear 34 and the second gear 35.

In addition, first and second bearings 38 and 39 may be installed on rotation shafts of the first gear 34 and the second gear 35, respectively.

The fire extinguisher 40 may include a barrel 41 and a valve assembly 42.

The barrel 41 stores fire-extinguishing powder and has a cylindrical shape.

The valve assembly 42 may include a valve head 43, the valve button 44 and a pressure gauge 45.

When the valve button 44 of the fire extinguisher 40 is pressed, a valve inside the valve head 43 opens and the fire-extinguishing powder may be pushed out due to internal high pressure.

The pressure gauge 45 displays the internal pressure of the fire extinguisher 40, and the fire extinguisher 40 should be inspected regularly by reading the pressure value of the pressure gauge 45, and if the pressure value is lower than a standard pressure, the fire extinguisher 40 should be replaced.

The valve button 44 is located at the uppermost position when the fire extinguisher 40 is upright, and at the frontmost position when the fire extinguisher 40 is installed lying down as shown in FIGS. 2, 7 and 8.

In addition, a hose 46 may be connected to the valve assembly 42 of the fire extinguisher 40, and a nozzle 47 may be installed at the end of the hose 46.

The fire extinguisher 40 is a consumable and may be purchased commercially, so a more detailed description thereof is omitted.

Meanwhile, the actuator unit 30 may include a stopper pin 37, as shown in FIG. 8. The stopper pin 37 may be installed on the first bracket 31 or the second bracket 32.

The stopper pin 37 limits reverse rotation such that the second gear 35 cannot rotate further when it rotates in a reverse direction.

Before mounting the fire extinguisher 40 in the box unit 20, the second gear 35 needs to be set to a standby position as shown in FIG. 8(*a*).

The motor unit 33 rotates the second gear 35 in a reverse direction, and, when the second gear 35 reaches the limit where it cannot rotate any further by touching the stopper pin 37, the motor unit 33 sets the limit position to an initial position.

That is, the reverse rotation limit of the second gear 35 may be set to the position of the second gear 35 when the fire extinguisher 40 is not operating.

Meanwhile, the radius of the pitch circle of the second gear 35 may be 1.5 to 2.5 times longer than a distance from the center of rotation of the second gear 35 to the point where the pusher face 36 touches the valve button 44, and the pitch circle of the second gear 35 may be 3 to 4 times longer than the pitch circle of the first gear 34.

The fire extinguisher 40 is operated only when the valve button 44 is pressed to an appropriate pressure or higher to prevent it from being unintentionally activated by any external force.

When the motor unit 33 operates, the first gear 34 rotates at a high rotation speed, but the torque may be low.

By setting the pitch circle of the second gear 35 to be 3 to 4 times that of the first gear 34, the rotation speed of the second gear 35 becomes slower than that of the first gear 34, but the torque may be increased 3 to 4 times.

In addition, by setting the radius of the pitch circle of the second gear to 35 to 1.5 to 2.5 times a distance from the center of rotation of the second gear 35 to the point where the pusher face 36 touches the valve button 44, the pressure applied from the pusher face 36 to the valve button 44 may be increased from 1.5 to 2.5 times according to the lever principle.

Accordingly, the security robot having a fire extinguisher mounted thereon according to an embodiment of the present invention may reliably operate the fire extinguisher 40 by pressing the valve button 44 with a large force even if the torque output from the motor unit 33 is somewhat small.

Meanwhile, a base wall 22 may be placed vertically inside the box unit 20, a pocket mount 24 is formed concavely in the base wall 22, and a part of the valve assembly 42 of the fire extinguisher 40 is accommodated in the pocket mount 24, as shown in FIGS. 4 to 5*b*.

This may align the posture of the fire extinguisher 40 and set the position of the valve button 44.

The barrel 41 of the fire extinguisher 40 is cylindrical and thus can roll easily, but the valve assembly 42 is not cylindrical and has a unique shape. By accommodating a part of the valve assembly 42 in the pocket mount 24, the fire extinguisher 40 may be aligned in posture without rolling arbitrarily.

In addition, when the fire extinguisher 40 is pushed into the box unit 20 to be mounted therein, a portion of the valve assembly 42 is accommodated in the pocket mount 24 so that the fire extinguisher 40 can be inserted to a proper depth and then its posture can be aligned without proceeding further.

In particular, the valve button 44 is located at the very front of the fire extinguisher 40, and the valve button 44 may be aligned to stay in a specific position as shown in FIGS. 7(*a*) and 8(*a*).

If a part of the valve assembly 42 is configured to proceed without being accommodated in the pocket mount 24, the valve button 44 may touch some part of the actuator unit 30 at some point, causing the fire extinguisher 40 to operate unintentionally. However, when the entry limit of the fire extinguisher 40 is set as described above, there is no concern that the fire extinguisher 40 will operate arbitrarily during the process of mounting the fire extinguisher 40.

Meanwhile, a supporter 26 is placed on the bottom of the box unit 20, and the supporter 26 may form a straight groove, as shown in FIGS. 5*a* and 5*b*.

This allows the fire extinguisher 40 to enter the supporter 26 while resting on the straight groove, so that the direction of entry is not crooked but straight, and the valve button 44 does not hit the box unit 20.

As described above, the valve of the valve assembly 42 may open and the fire-extinguishing powder may be ejected when the valve button 44 of the fire extinguisher 40 is pressed, but the valve button 44 can be prevented from being pressed accidentally even if a user is careless when installing the fire extinguisher 40.

Meanwhile, the security robot having a fire extinguisher mounted thereon according to an embodiment of the present invention may include a cap cover 50 and a mount cover 52.

The cap cover 50 may be made of an elastic material, and may be mounted on the bottom of the fire extinguisher 40. The fire extinguisher 40 has a cylindrical bottom when standing upright. The cap cover 50 may be fitted into the cylinder formed at the bottom of the fire extinguisher 40.

The cap cover 50 may absorb the shock that may occur when the fire extinguisher 40 moves by inertia when the security robot 10 stops after driving.

In addition, the cap cover 50 may prevent the fire extinguisher 40 from shaking randomly when the security robot 10 is driving.

The mount cover 52 may be placed on the outside of the cap cover 50 and fixed to the box unit 20.

The mount cover 52 is in contact with the outside of the cap cover 50, thus preventing the fire extinguisher 40 from being detached.

Meanwhile, a mounting hole 54 may be formed on one side of the mount cover 52, as shown in FIG. 2*b*.

A nut 48 is provided at the end of the hose 46 of the fire extinguisher 40, and the nut 48 may be fastened to the nozzle 47.

That is, the nozzle 47 may be fixed to the mount cover 52 by inserting the nozzle 47 from the outside of the mounting hole 54 and fastening the nut 48 to the nozzle 47.

The mount cover 52 may be made of a durable material and may be firmly fixed to the box unit 20, which ultimately determines the spray direction of the nozzle 47.

When the security robot 10 is postured in a specific direction, the fire-extinguishing powder of the fire extinguisher 40 may be sprayed toward a target point through the nozzle 47.

That is, the security robot 10 may control the nozzle 47 to aim at the target point, thereby accurately spraying the fire-extinguishing powder toward the target point and thus more accurately extinguishing the initial fire.

Meanwhile, a case pocket 14 may be formed on one side of an outer cover of the security robot 10, and the case pocket 14 may serve as a passage through which the nozzle 47 can pass.

In addition, an outer cover 15 may be further provided as shown in FIGS. 1 and 2*a*. A nozzle hole 16 may be formed on one side of the outer cover 15, and the nozzle 47 may pass through the nozzle hole 16.

The outer cover 15 is a component that constitutes the exterior of the security robot 10 and may be flame-retardant. This will protect the outer cover 15 from high temperatures in the event of a fire. Likewise, the flame-facing side of the exterior of the security robot 10 may be flame retardant, thereby preventing the security robot 10 from being damaged by the high temperature of the fire.

Hereinafter, the operation of the security robot having a fire extinguisher mounted thereon according to an embodiment of the present invention is described.

First, the installation or replacement of the fire extinguisher 40 is described.

The outer cover 15 is disassembled from the security robot 10, and the mount cover 52 is disassembled from the box unit 20.

Next, when the mount cover 52 is pulled outward, the fire extinguisher 40 comes out together with the mount cover 52 and is disassembled.

The hose 46 is separated from the valve assembly 42, and the nozzle 47 does not need to be disassembled from the mount cover 52.

When installing a new fire extinguisher 40 on the security robot 10, the hose 46 is connected to the valve assembly 42 of the fire extinguisher 40, and the nozzle 47 remains assembled on the mount cover 52.

Next, the fire extinguisher 40 is positioned such that the valve assembly 42 of the fire extinguisher 40 enters the box unit 20 first, and then the fire extinguisher 40 is pushed into the box unit 20.

When the fire extinguisher 40 is pushed into the box unit 20, a user can feel the valve head 43 touching the base wall 22 at some point, and when rotating the fire extinguisher 40 left and right, the user can feel the valve head 43 settling into the pocket mount 24.

In a state where the fire extinguisher 40 is correctly postured in the box unit 20, the mount cover 52 is fixed to the box unit 20, and then the outer cover 15 is fixed to the outer cover of the security robot 10.

Hereinafter, the operation of the security robot having a fire extinguisher mounted thereon according to an embodiment of the present invention is explained with reference to FIGS. 1, 7 and 8.

As described above, the security robot 10 drives autonomously, drives along a set path, or drives according to a command controlled by a remote management room.

The security robot 10 may detect a fire directly through the camera unit 11, and the security robot 10 may be deployed to a fire scene after the fire is detected by other fire detection means in the remote management room.

The security robot 10 positions itself so that the nozzle 47 aims at the fire point.

Before the fire extinguisher 40 is operated, the valve button 44 protrudes, the valve button 44 and the pusher face 36 face each other, and the second gear 35 remains in a backward rotation state, as shown in FIGS. 7(*a*) and 8(*a*).

Next, when a signal to operate the fire extinguisher 40 is given, the motor unit 33 operates to rotate the first gear 34, and the first gear 34 rotates the second gear 35, as shown in FIGS. 7(*b*) and 8(*b*).

The second gear 35 rotates and the pusher face 36 moves forward to press the valve button 44.

When the valve button 44 of the fire extinguisher 40 is pressed, the valve of the valve assembly 42 opens and the fire-extinguishing powder is sprayed toward a target point through the valve assembly 42, the hose 46, and the nozzle 47.

Therefore, the security robot having a fire extinguisher mounted thereon according to an embodiment of the present invention can patrol a facility to check for abnormalities such as intrusion by outsiders, and can operate the fire extinguisher 40 when encountering a fire during patrol, thereby quickly extinguishing a fire in its early stages. In particular, the security robot 10 can access dangerous places that are difficult for people to access, so it can be advantageous in extinguishing a fire in its early stages.

Although embodiments of the present invention have been described with reference to the accompanying drawings, those skilled in the art will understand that the present invention can be easily changed or modified into other specified forms without change or modification of the technical spirit or essential characteristics of the present invention.

Therefore, it should be understood that the aforementioned examples are only provided by way of example and not provided to limit the present invention. It should be understood that the scope of the present invention is defined by the following claims, and the invention is to cover all modifications, equivalents, and alternatives falling within the spirit and scope of the invention as defined by the claims.

INDUSTRIAL APPLICABILITY

A security robot having a fire extinguisher mounted thereon according to an embodiment of the present invention can be used to patrol and extinguish a fire in its early stages.

The invention claimed is:

1. A security robot having a fire extinguisher mounted thereon, comprising:
- a box unit in which a fire extinguisher is aligned and mounted; and
- an actuator unit placed on one side of the box unit,
- wherein the actuator unit comprises:
- a motor unit installed on a first bracket and configured to output rotational power;
- a first gear installed on a motor shaft of the motor unit; and
- a second gear rotatably installed on the first bracket, wherein one side of the second gear is provided with a gear so that the gear is engaged with the first gear, and another side of the second gear is provided with a pusher face so that the pusher face presses a valve button of the fire extinguisher when the motor unit is operated;
- further comprising a stopper pin installed on the first bracket,
- wherein the stopper pin limits reverse rotation such that the second gear cannot rotate further when the second gear rotates in reverse, and
- the reverse rotation limitation of the second gear is set to a posture of the second gear when the fire extinguisher is not in operation,
- wherein a radius of a pitch circle of the second gear is 1.5 to 2.5 times longer than a distance from a center of rotation of the second gear to a point where the pusher face touches the valve button, and the pitch circle of the second gear is 3 to 4 times longer than a pitch circle of the first gear,
- wherein a base wall is vertically arranged inside the box unit,
- a pocket mount is concavely formed in the base wall, and
- a portion of a valve assembly of the fire extinguisher is accommodated in the pocket mount so that a posture of the fire extinguisher is aligned and a position of the valve button is set;
- further comprising:
- a camera unit for taking video images, the camera unit being equipped with a thermal imaging camera and a video camera;
- a drive unit configured to drive the security robot to a desired location; and
- a communication circuitry configured to transmit video data collected from the security robot to a remote management room and receive a command from the remote management room.

2. The security robot according to claim 1, wherein a supporter is placed on a bottom of the box unit,
- wherein the supporter forms a straight groove so that, when the fire extinguisher enters the supporter, the fire extinguisher enters while resting on the straight groove, which ensures a direction of entry not to be crooked but to be straight and prevents the valve button from hitting the box unit.

3. The security robot according to claim 2, comprising:
- a cap cover made of an elastic material and mounted on a bottom of the fire extinguisher; and
- a mount cover arranged on an outside of the cap cover and fixed to the box unit,
- wherein the cap cover absorbs shock that may occur when the fire extinguisher moves by inertia when the security robot stops after driving, and
- the mount cover prevents the fire extinguisher from being detached.

4. The security robot according to claim 3, wherein a mounting hole is formed on one side of the mount cover, wherein a nozzle of the fire extinguisher is aligned and placed in the mounting hole so that a fire-extinguishing powder is aimed at and sprayed to a target point.

* * * * *